United States Patent
Peres et al.

(10) Patent No.: US 10,960,644 B2
(45) Date of Patent: Mar. 30, 2021

(54) ELEMENT FOR MINERAL SYNTHETIC SURFACE COVERING

(71) Applicant: TARKETT GDL S.A., Lentzweiler (LU)

(72) Inventors: Richard Peres, Wiltz (LU); Frédéric Pailler, Wiltz (LU); Jean-Luc Stiernet, Wiltz (LU)

(73) Assignee: TARKETT GDL S.A., Lentzweiler (LU)

(*) Notice: Subject to any disclaimer, the term of this patent is extended or adjusted under 35 U.S.C. 154(b) by 0 days.

(21) Appl. No.: 15/563,137

(22) PCT Filed: Mar. 31, 2016

(86) PCT No.: PCT/EP2016/057089
§ 371 (c)(1),
(2) Date: Sep. 29, 2017

(87) PCT Pub. No.: WO2016/156506
PCT Pub. Date: Oct. 6, 2016

(65) Prior Publication Data
US 2018/0086027 A1     Mar. 29, 2018

(30) Foreign Application Priority Data

Mar. 31, 2015 (EP) .................................. 15162060

(51) Int. Cl.
*B32B 17/02* (2006.01)
*B32B 27/30* (2006.01)
*B32B 27/36* (2006.01)
*B32B 27/40* (2006.01)

(52) U.S. Cl.
CPC .......... *B32B 17/02* (2013.01); *B32B 27/308* (2013.01); *B32B 27/36* (2013.01); *B32B 27/40* (2013.01); *B32B 2255/02* (2013.01); *B32B 2307/412* (2013.01)

(58) Field of Classification Search
CPC ............ B32B 17/02; Y10T 428/24364; Y10T 428/2443

USPC ......................................................... 428/208
See application file for complete search history.

(56) References Cited

U.S. PATENT DOCUMENTS

| | | | | |
|---|---|---|---|---|
| 2004/0086678 A1* | 5/2004 | Chen | ..................... | B05D 5/061 428/44 |
| 2004/0255823 A1* | 12/2004 | Comrie | ................... | C04B 28/24 106/789 |
| 2011/0311779 A1* | 12/2011 | Alston | .................. | B05D 3/002 428/161 |
| 2012/0260594 A1* | 10/2012 | Blackstock | ........... | C04B 28/006 52/302.1 |
| 2016/0230382 A1* | 8/2016 | Vermeren | ............... | B32B 13/02 |
| 2018/0340072 A1* | 11/2018 | Anstine | ................. | H01B 13/00 |

FOREIGN PATENT DOCUMENTS

| | | | |
|---|---|---|---|
| EP | 2789476 | 10/2014 | |
| WO | WO-2012136188 | 10/2012 | |
| WO | WO-2015039913 A1 * | 3/2015 | ............. E04C 2/288 |

OTHER PUBLICATIONS

International Search Report for PCT/EP2016/057089, dated May 9, 2016.
European Search Report for EP15162060, completed Sep. 1, 2015.

* cited by examiner

*Primary Examiner* — Betelhem Shewareged
(74) *Attorney, Agent, or Firm* — B. Aaron Schulman, Esq.; Stites & Harbison, PLLC

(57) ABSTRACT

The present invention concerns a surface covering element comprising: a mineral substrate layer, optionally coated with a suitable primer; a decor printed onto the substrate layer, forming a decor layer; and—a transparent protection layer obtained from a curable polymer formulation. It further concerns a process for its manufacture comprising the following steps: a. providing a mineral substrate layer; b. optionally, applying a primer onto at least one surface of the mineral substrate layer; c. printing a decor onto the substrate layer; and d. coating the printed decor with a transparent protection layer obtained from a curable polymer formulation.

16 Claims, No Drawings

ELEMENT FOR MINERAL SYNTHETIC SURFACE COVERING

TECHNICAL FIELD

The present invention concerns the field of synthetic surface coverings, notably wall coverings and floorings. More specifically, it refers to elements for synthetic surface coverings which are based on mineral materials. The present invention also concerns such a process of manufacture.

BACKGROUND ART

Organic polymer surface coverings such as vinyl flooring are popular flooring materials since many years.

However, such surface coverings also have limitations, notably with regard to properties such as resistance to humidity.

Further, consumers express increasing interest in alternative surface covering solutions with reduced content in chlorinated materials and volatile organic compounds.

Technical Problem

The present invention aims to provide synthetic surface coverings elements, notably wall and floor coverings, which show an improved resistance to humidity.

It further aims to provide such surface covering elements which has a very low content in chlorinated materials and in volatile organic compounds (VOC).

It further aims to provide such covering elements manufactured from compounds from non-synthetic or renewable resources.

It further aims to provide such covering elements which may be produced using a limited number of steps and products.

Solution to Problem

It has now been surprisingly found that the above technical problems may be solved according to the invention by providing a synthetic surface covering elements comprising a mineral substrate layer such as a geopolymer or fiber cement.

Indeed, geopolymers are high resistance materials that are used for fire- and heat-resistant coatings and adhesives, medicinal applications, binders for fire-resistant fiber composites and new cements for concrete. Geopolymers are also favorable from an environmental point of view as they produce much less $CO_2$ compared to conventional cement such as Portland cement.

Fiber cement also has favorable properties, in particular a good resistance to rot, termites, fire damage, sun, warping and permanent water damage. Fiber cement is further an energy efficient material and requires less energy in assembly and construction than most other wall materials.

However, the use of such mineral materials for the manufacture of surface covering elements poses specific difficulties, notably because of their high porosity and the alkaline pH at the surface.

SUMMARY OF INVENTION

According to a first aspect, the invention is directed to a surface covering element comprising:
a mineral support layer, optionally coated with a suitable primer;
a decor printed onto the substrate layer, forming a decor layer; and
a protection layer.

The substrate layer may in particular be based on a geopolymer or fiber cement, notably comprising organic or mineral fibers.

According to a preferred embodiment, the present invention relates to a surface covering element comprising:
a mineral support layer, optionally coated with a suitable primer;
a decor printed onto the substrate layer, forming a decor layer; and
a transparent protection layer obtained from a curable polymer formulation.

The protection layer is preferably obtained from curable polymer formulations, preferably comprising polyurethane.

Preferably, the protection layer is obtained from a formulation comprising one or more polyurethanes, one or more polyacrylic polymers and one or more polyesters.

The surface covering element is preferably a wall covering or a floor covering.

The surface covering element advantageously further comprises a connecting system located on the edges of the surface covering element.

Preferably, the primer coating is based on an acrylic polymer.

Advantageously, the primer coating comprises 40 to 90% by weight of an acrylic polymer.

According to a second aspect, the invention is directed to a process for the manufacture of a surface covering element according to the invention comprising the following steps:
  a. providing a mineral substrate layer;
  b. optionally, applying a primer onto at least one surface of the mineral substrate layer;
  c. printing a decor onto the substrate layer; and
  d. coating the printed decor with a protection layer.

The step c is preferably carried out using an ink-jet printer.

Advantageously, step c is carried out using a digital printer.

Preferably, the temperature during the process of manufacture does not exceed 300° C., preferably 180° C. and in particular 160° C.

[Definitions]

Within the present text, the term "geopolymer" is meant to designate an essentially mineral chemical compound or mixture of compounds consisting of repeating units comprising silicon, aluminum, phosphorous, iron, or other metal cations linked together by oxygen atoms, for example silico-oxide (—Si—O—Si—O—), silico-aluminate (—Si—O—Al—O—), ferro-silico-aluminate (—Fe—O—Si—O—Al—O—) or alumino-phosphate (—Al—O—P—O—). The microstructure of geopolymers is essentially temperature dependent. Indeed, it is amorphous at room temperature, but may evolve into a crystalline matrix at higher temperatures, for instance above 500° C.

There are essentially two synthesis routes for geopolymers, one that is carried out in alkaline medium ($Na^+$, $K^+$, $Li^+$, $Ca^{++}$, $Cs^+$ and the like) and one in acidic medium, for example using phosphoric acid and humic acids. Out of the two routes, the alkaline route is today commercially the most important.

Within the present text, the term "fiber cement" is meant to designate a composite material comprising cement, notably Portland cement, which is reinforced with fibers such as cellulosic fibers.

Within the present text, the term "transparent" is meant to designate a material which largely transmits visible light with no appreciable attenuation, absorption or scattering. The transmittance of a material may be made using a spectrophotometer. The degree of light transmission may be assessed using ASTM D-1003 (Standard Test Method for Haze and Luminous Transmittance of Transparent Plastics). A material with a light transmission of 85% or more is considered to be 'transparent'.

DETAILED DESCRIPTION

In its largest expression, the present invention is directed to synthetic surface covering elements which comprise a mineral substrate.

Such mineral-based surface covering elements of the invention shows an improved resistance humidity compared to organic equivalents and further exhibits a very low content in chlorinated materials and in volatile organic compounds (VOC).

According to a first aspect, the invention is thus directed to a surface covering element comprising:
- a mineral substrate layer, optionally coated with a suitable primer;
- a decor printed onto the substrate layer, forming a decor layer; and
- a protection layer.

The surface covering elements may be in particular in a form suitable to be assembled so as to cover a wall or a floor, for example rectangular. Such elements may is present a total thickness comprised between 5 mm and 50 mm, preferably between 10 mm and 30 mm and in particular between 15 mm and 20 mm. Their size may vary largely, but the side length will generally be comprised between 10 mm and 10 000 mm, preferably between 50 mm and 1 000 mm, and in particular between 100 mm and 500 mm.

Preferably, such elements are rigid.

The mineral substrate may be selected notably among mineral polymers, and more specifically among geopolymers and fiber cements.

Indeed, further to the advantages mentioned above, such materials are easily available on the market, are easy to handle and show advantageous mechanical properties.

Preferred are geopolymers including silico-oxide (—Si—O—Si—O—), silico-aluminate (—Si—O—Al—O—) and/or ferro-silico-aluminate (—Fe—O—Si—O—Al—O—) groups. Further preferred are geopolymers which were not submitted to a heat treatment and are thus amorphous or only partially crystalline.

The appropriate geopolymer type may be selected according to the intended use. The thickness of the geopolymer may be notably between 3 mm and 10 mm.

For some applications, it may be advantageous to use geopolymers which are fiber reinforced, as explained below regarding the fiber cement.

Preferred fiber cements include specifically cement reinforced with fibers provided by mineral or organic renewable sources such as plants. Particularly interesting are fiber cements including cellulose.

The fiber content of the cement may vary largely according to the properties required. Indeed, cements with high fiber content have a lower weight, which can be useful for some applications such as wall coverings. In contrast, cements with lower fiber content generally have strengthened mechanical properties.

Fiber cements appropriate as substrate layer for the surface coverings of the invention however generally contain between 10% to 80%, preferably between 20% and 70% and in particular between 30% and 60% by weight fibers.

The nature of the cement in the fiber cement may be selected according to the intended use. The thickness of the fiber cement may be notably between 3 mm and 10 mm.

Before use, the mineral substrates may be treated so as to control their surface pH to be in a range of 10 to 4, preferably 8 to 6.

In some cases, it may be favorable to coat the mineral substrate with a primer so as to improve its surface properties such as its porosity, and its compatibility with the is subsequent layers, notably the ink formulation and the protection layer.

Such primer coatings are well known in the art. The use of a water-based primer coating is preferred.

The formulation for the primer coating may notably comprise one or more polymers, dispersants, wetting aids, defoamers, and further additives as appropriate. The polymer may be in particular an acrylic polymer or copolymer. Preferably, the polymer is added to the formulation in a water based form, such as a dispersion or emulsion. Preferably, the primer formulation comprises between 40% to 90%, preferably between 50% and 80% by weight of polymer formulation.

The primer formulation may further comprise between 5% and 25% by weight of dispersant.

Finally, the primer formulation may also comprise between 0.1% to 10% by weight of wetting aids, defoamers and further additives as appropriate. In particular, a cosolvent such as glycerol may be present, notably in a proportion of up to 10% by weight.

The primer coating may be applied using the methods known in the art. In particular, it may be applied using a roll coater or another rolling device such as a spray gun or a paint roller.

After application, the primer coating is left to dry in suitable conditions. Generally, it is appropriate to leave the coated substrate at a temperature below 70° C. for a time comprised between 30 sec and 5 minutes.

An important aspect of the present invention is that the decor is printed directly onto the mineral substrate layer, and not on a separate decor layer such as a foil or paper. This feature significantly simplifies the manufacture process and further eliminates the need of adhesives so as to secure the decor layer onto the substrate layer.

Accordingly, the ink formulation used for printing has to be formulated so as to show suitable definition, deep and stable color, along with suitable wetting and adherence to the substrate layer.

The ink formulations are preferably water-based. Most preferably, they do not contain any volatile organic compounds.

Such ink formulations are well known in the art. Appropriate ink formulations are available for instance under the name of Aquacron® (sold by the company PPG) or Armorseal® (sold by the company Sherwin Williams).

The surface covering according to the invention further comprises a protection layer so as to protect the decor layer.

Such protection layers are well-known in the industry. They are generally transparent, but may in certain cases also be tinted by addition of suitable dyes.

For décor designs which do not cover completely the surface, the protection layer should be selected so as to ensure further also a suitable adherence and compatibility with the mineral substrate layer.

Suitable materials for such a protection layer may in particular be based on polymers such as polyurethanes and acrylic polymers.

Particularly preferred are polymers which are available in aqueous solution or dispersion.

Generally, the protection layer is selected so as to ensure protection of the decor from UV light. Further, notably if the surface covering is intended for flooring applications, the protection layer should also confer mechanical protection, notably resistance to scratch and wear.

The protection layer formulation may notably comprise one or more polymers, photoinitiators, accelerators, dispersants, matting agents, hardeners and further additives as appropriate.

The polymer may be in particular chosen from polyurethanes, polyacrylic polymers and/or polyesters. Preferably, the polymer is added to the formulation in a water based form, such as a dispersion or emulsion. UV curable polymers are particularly preferred. Preferably, the protection layer formulation comprises between 40% to 90%, preferably between 50% and 80% by weight of polymer formulation.

A protection layer formulation comprising one or more polyurethanes, one or more polyacrylic polymers and one or more polyesters is particularly preferred.

The protection layer formulation may further comprise between 0.1% and 5% by weight of accelerator. The protection layer formulation may further comprise between 0.1% and 5% by weight of dispersant. Also, the protection layer formulation may also comprise one or more photoinitiators, preferably in a proportion of between 0.1% to 10% by weight. The protection layer formulation may further comprise one or more matting agents, preferably in a proportion of between 5% to 20% by weight. The protection layer formulation may further comprise one or more hardeners, preferably in a proportion of about 1% to 10%, preferably 2% to 5% by weight. In addition to these products, the formulation may further comprise other additives as appropriate.

For some designs, for example in case of a wood design, it may be advantageous to further emboss the protection layer so as to obtain a structured surface.

The surface covering according to the invention may in particular be a rigid element appropriate to be laid out and assembled on site to form the flooring.

According to a preferred embodiment, the surface covering element of the invention thus further comprises suitable means to facilitate the assembly, such as a lockage tongue and groove connection.

According to a second aspect, the invention is directed to a process for the manufacture of the surface covering elements of the invention comprising the following steps:
a. providing a mineral substrate layer;
b. optionally, applying a primer onto at least one surface of the mineral
substrate layer;
c. printing a decor onto the substrate layer; and
d. coating the printed decor with a protection layer.

The printing of the decor onto the mineral substrate layer in step c is preferably carried out using an ink-jet printer. However, other printing means such as printing rollers may also be used. Particularly preferred is a digital printer.

A particular advantage of the process of the invention is the fact that the temperature required during the process does not exceed 300° C. Preferably, that temperature does not exceed 180° C. and in particular, it does not exceed 160° C. The low temperature of the manufacture process opens a larger panel of possible materials, notably with regard to the pigments in the ink formulation.

The mineral surface covering of the invention thus produced has favorable properties, notably an improved resistance to humidity. It is also environmentally friendly since it uses little if no chlorinated materials or volatile organic compounds (VOC) and further preferably comprises materials from renewable resources.

The invention will be described more in detail in the following examples.

EXAMPLES

Example 1

Preparation of a decorative flooring element based on geopolymer

The flooring element is manufactured as follows.

A piece of geopolymer with a thickness of 6 mm having a size of 10×30 cm is washed with deionized water three times so as to eliminate the alkaline compounds at the is surface and lower the surface pH from 14 to around 8.

The prepared mineral substrate is then coated with a primer formulation as set out in table 1 below using a roll coater and left to dry for 5 minutes at a temperature of 50° C.

TABLE 1

Composition of the primer formulation

| Product | [parts by weight] |
| --- | --- |
| Neocryl A-1131 = 250 cps | 59 |
| Neocryl XK 151 | 20 |
| Disperbyk 190 | 20 |
| Tego wet KL 245 | 1.3 |
| Tego foamex 842 | 1.3 |
| Glycerol | 4 |
| Total | 104.3 |

The dry substrate is then printed using a water-based ink AQUACRON sold by PPG with a digital printer.

The printed substrate is then coated with a two-component polyurethane coating. The coating is reticulated under UV light as appropriate and left to dry.

TABLE 2

Composition of the formulation for the protection layer

| Product | Function | [parts by weight] |
| --- | --- | --- |
| Desmolux U 100 (Bayer Material Science) | Polyurethane | 26.2 |
| 1,6-hexanedioldiacrylate (HDDA) (Arkema France) | Acrylic polymer | 30.6 |
| Propoxylated glycerol triacrylate (OTA 480) | Acrylic polymer | 13.1 |
| EBECRYL 770 (Allnex) | Polyester | 1.0 |
| EBECRYL P116 (Allnex) | Accelerator | 1.7 |
| Disperbyk 185 (BYK) | Dispersant | 1.8 |
| ADDITOL BP (Allnex) | Photoinitiator | 2.6 |
| ESAcure Kip100 (Lamberti) | Photoinitiator | 1.8 |
| Syloid RAD 2005 | Matting agent | 6.1 |

TABLE 2-continued

Composition of the formulation for the protection layer

| Product | Function | [parts by weight] |
|---|---|---|
| (Grace) | | |
| DEUTERON MK (Deuteron GmbH) | Matting agent | 2.2 |
| Alodur F 800 (Treibacher) | Hardener | 3.0 |
| ORGASOL 2002 D NAT 1 (Orgasol) | Additive | 10.0 |
| TOTAL | | 100.1 |

The synthetic flooring prepared in example 1 comprises no chlorinated materials and virtually no volatile organic compounds, and is thus an attractive alternative to synthetic flooring solutions based on organic polymers.

Example 2

The Example 1 is repeated except that the primer formulation used is as set out in the table 3 below.

TABLE 3

Composition of the primer formulation

| Product | [parts by weight] |
|---|---|
| Ecrylic DA 194 | 79 |
| Disperbyk 190 | 20 |
| Tego wet KL 245 | 1.3 |
| Tego foamex 842 | 1.3 |
| Glycerol | 4 |
| Total | 104.3 |

The synthetic flooring prepared in example 2 comprises no chlorinated materials and virtually no volatile organic compounds, and is thus an attractive alternative to synthetic flooring solutions based on organic polymers.

The invention claimed is:

1. A surface covering element comprising:
a mineral substrate layer;
a decor printed directly onto the mineral substrate layer, forming a decor layer; and
a transparent protection layer obtained from a curable polymer formulation;
wherein the mineral substrate layer is based on a fiber cement, and wherein the mineral substrate layer is not coated with a primer.

2. The surface covering element according to claim 1, wherein the mineral substrate layer further comprises organic or mineral fibers.

3. The surface covering element according to claim 1, wherein the curable polymer formulation comprises polyurethane.

4. The surface covering element according to claim 1, wherein the transparent protection layer is obtained from a formulation comprising one or more polyurethanes, one or more polyacrylic polymers, and one or more polyesters.

5. The surface covering element according to claim 1, wherein the surface covering is a wall covering.

6. The surface covering element according to claim 1, wherein the surface covering is a floor covering.

7. The surface covering element according to claim 5, further comprising a connecting system located on the edges of the surface covering element.

8. A process for the manufacture of a surface covering element according to claim 1, comprising:
   a. providing a mineral substrate layer;
   b. printing a decor directly onto the mineral substrate layer, wherein the mineral substrate layer is not coated with a primer; and
   c. coating the printed decor with a transparent protection layer obtained from a curable polymer formulation.

9. The process according to claim 8, wherein b is carried out using an ink-jet printer.

10. The process according to claim 8, wherein b is carried out using a digital printer.

11. The process according to claim 8, wherein the temperature does not exceed 300° C.

12. The surface covering element according to claim 6, further comprising a connecting system located on the edges of the surface covering element.

13. A surface covering element comprising:
a mineral substrate layer;
a decor directly printed onto the substrate layer, forming a decor layer wherein the mineral substrate layer is not coated with a primer; and
a transparent protection layer obtained from a curable polymer formulation wherein said mineral substrate layer is based on a geopolymer, and wherein said geopolymer is a chemical compound or mixture of compounds comprising repeating units of a material selected from the group consisting of silicon, aluminum, phosphorous, iron, and other metal cations linked together by oxygen atoms.

14. The surface covering element according to claim 13, wherein the mineral substrate layer further comprises organic or mineral fibers.

15. The surface covering element according to claim 13, wherein the curable polymer formulation comprises polyurethane.

16. The surface covering element according to claim 13, wherein the transparent protection layer is obtained from a formulation comprising one or more polyurethanes, one or more polyacrylic polymers, and one or more polyesters.

* * * * *